United States Patent
Han et al.

(10) Patent No.: US 9,936,415 B2
(45) Date of Patent: Apr. 3, 2018

(54) DRIVE TEST INFORMATION EXCHANGE METHOD AND APPARATUS

(71) Applicant: HUAWEI TECHNOLOGIES CO., LTD., Shenzhen, Guangdong (CN)

(72) Inventors: Jing Han, Beijing (CN); Jie Cui, Shenzhen (CN); Anjian Li, Beijing (CN); Hong Li, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/481,576

(22) Filed: Apr. 7, 2017

(65) Prior Publication Data

US 2017/0215099 A1 Jul. 27, 2017

Related U.S. Application Data (63) Continuation of application No. PCT/CN2014/088322, filed on Oct. 10, 2014.

(51) Int. Cl.
*H04W 24/00* (2009.01)
*H04W 24/10* (2009.01)
*H04W 4/02* (2018.01)

(52) U.S. Cl.
CPC .............. *H04W 24/10* (2013.01); *H04W 4/02* (2013.01)

(58) Field of Classification Search
None
See application file for complete search history.

(56) References Cited

U.S. PATENT DOCUMENTS

| | | | | |
|---|---|---|---|---|
| 6,058,338 A | * | 5/2000 | Agashe | G01S 19/05 244/158.8 |
| 2004/0203920 A1 | * | 10/2004 | Yoon | H04W 8/14 455/456.1 |

(Continued)

FOREIGN PATENT DOCUMENTS

| CN | 1556660 A | 12/2004 |
|---|---|---|
| CN | 102006621 A | 4/2011 |

(Continued)

OTHER PUBLICATIONS

International Search Report dated Jun. 29, 2015 in corresponding International Patent Application No. PCT/CN2014/088322.

(Continued)

*Primary Examiner* — German J Viana Di Prisco
(74) *Attorney, Agent, or Firm* — Staas & Halsey LLP (57) ABSTRACT

A drive test information exchange method and apparatus are disclosed. The method includes: receiving, by a positioning controller, a positioning request message sent by user equipment UE; sending, by the positioning controller, positioning assistance information to the UE after the positioning controller receives the positioning request message sent by the UE; receiving, by the positioning controller, a measurement result sent by the UE; obtaining, by the positioning controller, positioning information according to the measurement result; and sending, by the positioning controller, drive test information to a drive test unit according to the indication information. The method and the apparatus of the present invention may be used to enable a process of obtaining drive test information by a drive test unit to be simpler, and a delay to be shorter.

12 Claims, 7 Drawing Sheets

(56) References Cited

U.S. PATENT DOCUMENTS

| | | | |
|---|---|---|---|
| 2013/0095860 A1* | 4/2013 | Hapsari | H04W 4/02 455/456.5 |
| 2013/0190009 A1 | 7/2013 | Johansson et al. | |
| 2015/0181451 A1 | 6/2015 | Hapsari et al. | |

FOREIGN PATENT DOCUMENTS

| | | |
|---|---|---|
| CN | 102056216 A | 5/2011 |
| CN | 102421118 A | 4/2012 |
| EP | 2635065 A1 | 9/2013 |
| EP | 2804417 A1 | 11/2014 |
| EP | 2882219 A2 | 6/2015 |
| WO | 2013/104311 A1 | 7/2013 |
| WO | 2014/021239 A1 | 2/2014 |
| WO | 2014/021695 A2 | 2/2014 |
| WO | 2014/025343 A1 | 2/2014 |

OTHER PUBLICATIONS

Extended European Search Report dated Jul. 7, 2017 in corresponding European Patent Application No. 14903617.0.
International Search Report dated Jun. 29, 2015 in corresponding International Application No. PCT/CN2014/088322.

\* cited by examiner

DRIVE TEST INFORMATION EXCHANGE METHOD AND APPARATUS

CROSS-REFERENCE TO RELATED APPLICATIONS

This application is a continuation of International Application No. PCT/CN2014/088322, filed on Oct. 10, 2014, the disclosure of which is hereby incorporated by reference in its entirety.

TECHNICAL FIELD

The present invention relates to the field of communications technologies, and in particular, to a drive test information exchange method and apparatus.

BACKGROUND

An inevitable direction for developing mobile communications technologies is to optimize a network and improve network quality. A drive test technology is an important means for performing network optimization, and provides a measurement and evaluation function for a network performance indicator. In a conventional drive test technology, network data is manually collected by using a drive test instrument, and as a result, a lot of resources are consumed. Minimization of drive tests (MDT) is that user equipment (UE) performs measurement on a radio signal, the UE sends a measurement result to a positioning apparatus, the positioning apparatus obtains positioning information of the UE according to the measurement result of the UE, and then the positioning apparatus sends drive test information that includes the positioning information, the measurement result of the UE, and a time stamp to an MTD functional entity. Then, an operator may perform network optimization according to the drive test information of the UE. An MDT technology can reduce drive test overheads and a network optimization cost.

Network optimization needs not only a measurement result of a radio signal, but also location information of the radio signal. This is because even if the measurement result of the radio signal measured by UE is known, the measurement result is meaningless for the network optimization if a location of the measurement result is unknown. The location information is an important basis for the network optimization. Therefore, location information of the UE needs to be collected in MDT.

A positioning technology is a technology used to determine a geographic location of user equipment (UE), and location information of the UE can be directly or indirectly obtained by using a radio signal of a radio communication network. In Long Term Evolution (LTE), a commonly used UE positioning manner is network-assisted Global Navigation Satellite System (GNSS) positioning, observed time difference of arrival (OTDOA) positioning, enhanced cell ID (e-CID) positioning, or uplink-time difference of arrival (UTDOA) positioning. Generally, in a UE positioning algorithm of LTE, a geometric location of UE can be estimated according to a related positioning algorithm by detecting a characteristic parameter of a signal transmitted by a radio wave between the UE and a base station, such as field strength of the signal, a time difference of arrival of the transmitted signal, and an azimuth of arrival of the signal.

In an existing positioning technology based on an enhanced serving mobile location centre (E-SMLC), an E-SMLC module is placed on a core network (CN), and the E-SMLC executes UE positioning in a GNSS manner, an OTDOA manner, an e-CID manner, or a UTDOA manner. An MDT unit sends an MDT request to an evolved NodeB (eNB), the eNB delivers logged measurement configuration information to UE, and the UE sends a positioning request to the E-SMLC. The E-SMLC sends positioning assistance information to the UE, and may further deliver a positioning measurement configuration message. The UE sends, to the E-SMLC, a measurement result measured according to a positioning measurement configuration. The E-SMLC sends positioning information to the UE. The UE sends drive test information that includes the positioning information, the measurement result, and a time stamp to the base station. The base station sends the received drive test information to the MDT unit.

It can be seen from the foregoing method that, the E-SMLC is located on a CN side and has no interface for interacting with a drive test unit, and therefore the positioning information, the measurement result, and the time stamp need to be sent to the drive test unit by using the UE and the eNB. Consequently, there are many steps in a process of obtaining the foregoing information by the drive test unit, and a delay is relatively long.

SUMMARY

Embodiments of the present invention provide a drive test information exchange method and apparatus, so that a process of obtaining drive test information by a drive test unit is simpler, and a delay is shorter.

According to a first aspect, a drive test information exchange method is provided, including: A positioning controller receives a positioning request message sent by user equipment UE, where the positioning request message includes indication information indicating that positioning of the positioning controller is used for a purpose of a drive test. The positioning controller sends positioning assistance information to the UE after the positioning controller receives the positioning request message sent by the UE. The positioning controller receives a measurement result sent by the UE, where the measurement result is obtained by the UE by performing measurement according to the positioning assistance information. The positioning controller obtains positioning information according to the measurement result. The positioning controller sends drive test information to a drive test unit according to the indication information, where the drive test information includes the positioning information, the measurement result, and a time stamp.

In a first possible implementation manner, the positioning controller is an access network element.

According to a second aspect, a positioning controller is provided, including: a receiving unit, configured to receive a positioning request message sent by user equipment UE, where the positioning request message includes indication information indicating that positioning of the positioning controller is used for a purpose of a drive test; a sending unit, configured to send positioning assistance information to the UE after the receiving unit receives the positioning request message sent by the UE, where the receiving unit is further configured to receive a measurement result sent by the UE, where the measurement result is obtained by the UE by performing measurement according to the positioning assistance information; and a processing unit, configured to obtain positioning information according to the measurement result, where the sending unit is configured to send drive test information to a drive test unit according to the indication information, where the drive test information includes the positioning information, the measurement result, and a time stamp.

In a first possible implementation manner, the positioning controller is an access network element.

According to a third aspect, a drive test information exchange method is provided, including: User equipment UE sends a positioning request message to a positioning controller, where the positioning request message includes indication information, and the indication information is used to indicate that positioning of the positioning controller is used for a purpose of a drive test. After the UE sends the positioning request message to the positioning controller, the UE receives positioning assistance information sent by the positioning controller. The UE performs measurement according to the positioning assistance information so as to obtain a measurement result. The UE sends the measurement result to the positioning controller, so that the positioning controller sends, to a drive test unit according to the indication information, drive test information that includes the measurement result.

According to a fourth aspect, user equipment is provided, including: a sending unit, configured to send a positioning request message to a positioning controller, where the positioning request message includes indication information, and the indication information is used to indicate that positioning of the positioning controller is used for a purpose of a drive test; a receiving unit, configured to: after the sending unit sends the positioning request message to the positioning controller, receive positioning assistance information sent by the positioning controller; and a processing unit, configured to perform measurement according to the positioning assistance information so as to obtain a measurement result, where the sending unit is further configured to send the measurement result to the positioning controller, so that the positioning controller sends, to a drive test unit according to the indication information, drive test information that includes the measurement result.

According to a fifth aspect, a drive test information exchange method is provided, including: An element manager of a drive test unit sends a drive test request message to a base station, where the drive test request message is used by the base station to trigger a positioning controller to perform a drive test on user equipment. A trace collection entity of the drive test unit receives drive test information sent by the positioning controller. The drive test information includes positioning information, a measurement result, and a time stamp of the user equipment. The drive test information is sent by the positioning controller to the trace collection entity according to indication information. In a process in which the base station triggers the positioning controller to perform the drive test on the user equipment, the indication information is included in a positioning request message sent by the UE to the positioning controller and is used to indicate that positioning of the positioning controller is used for a purpose of the drive test.

In a first possible implementation manner, after the trace collection entity receives the drive test information sent by the positioning controller, if the element manager determines that time of the drive test information received by the trace collection entity is ineffective, or a quantity of UE related to the drive test information is insufficient, the element manager sends a drive test information request message to a drive test information storage apparatus so as to obtain new drive test information, and the drive test information storage apparatus is configured to store drive test information.

According to a sixth aspect, a drive test information exchange apparatus is provided, including: an element manager, configured to send a drive test request message to a base station, where the drive test request message is used by the base station to trigger a positioning controller to perform a drive test on user equipment; and a trace collection entity, configured to receive drive test information sent by the positioning controller. The drive test information includes positioning information, a measurement result, and a time stamp of the user equipment. The drive test information is sent by the positioning controller to the trace collection entity according to indication information. In a process in which the base station triggers the positioning controller to perform the drive test on the user equipment, the indication information is included in a positioning request message sent by the UE to the positioning controller and is used to indicate that positioning of the positioning controller is used for a purpose of the drive test.

In a first possible implementation manner, after the trace collection entity receives the drive test information sent by the positioning controller, if the element manager determines that time of the drive test information received by the trace collection entity is ineffective, or a quantity of UE related to the drive test information is insufficient, the element manager sends a drive test information request message to a drive test information storage apparatus so as to obtain new drive test information, and the drive test information storage apparatus is configured to store drive test information.

The positioning controller provided in the embodiments of the present invention receives a positioning request message sent by user equipment UE. Because a direct interface is established between the positioning controller and a drive test unit, the positioning controller may send drive test information to the drive test unit according to indication information that is included in the positioning request information sent by the UE, so that signaling exchange is reduced, a drive test process is simplified, and a delay is shorter.

According to a seventh aspect, a drive test information exchange method is provided, including: A drive test information storage apparatus receives a drive test information request message sent by a drive test unit, where the drive test information request message includes a user equipment identifier, effective time, or a combination thereof. The drive test information storage apparatus stores drive test information, and the drive test information includes positioning information, a measurement result, and a time stamp of user equipment. The drive test information storage apparatus sends, according to the user equipment identifier, the effective time, or the combination thereof, the drive test information corresponding to the user equipment identifier, the effective time, or the combination thereof to the drive test unit.

In a first possible implementation manner, the drive test information storage apparatus includes a storage unit. The storage unit includes a first positioning database. The first positioning database is configured to store positioning information, a measurement result, and a time stamp within a coverage area of one positioning controller.

In a second possible implementation manner, the drive test information storage apparatus includes a storage unit. The storage unit includes a second positioning database. The second positioning database is configured to store positioning information, a measurement result, and a time stamp within a coverage area of multiple positioning controllers.

According to an eighth aspect, a drive test information storage apparatus is provided, including: a receiving unit, configured to receive a drive test information request message sent by a drive test unit, where the drive test information request message includes a user equipment identifier, effective time, or a combination thereof; a storage unit, where the storage unit stores drive test information, and the drive test information includes positioning information, a measurement result, and a time stamp of user equipment; and a sending unit, configured to send, according to the user equipment identifier, the effective time, or the combination thereof, the drive test information corresponding to the user equipment identifier, the effective time, or the combination thereof to the drive test unit.

In a first possible implementation manner, the storage unit includes a first positioning database. The first positioning database is configured to store positioning information, a measurement result, and a time stamp within a coverage area of one positioning controller.

In a second possible implementation manner, the storage unit includes a second positioning database. The second positioning database is configured to store positioning information, a measurement result, and a time stamp within a coverage area of multiple positioning controllers.

According to a ninth aspect, a drive test information exchange method is provided, including: A drive test unit sends a drive test information request message to a drive test information storage apparatus, where the drive test information request message includes a user equipment identifier, effective time, or a combination thereof. The drive test information storage apparatus stores drive test information, and the drive test information includes positioning information, a measurement result, and a time stamp of user equipment. The drive test unit receives a drive test information acknowledgement message sent by the drive test information storage apparatus according to the user equipment identifier, the effective time, or the combination thereof, where the drive test information acknowledgement message includes the drive test information.

In a first possible implementation manner, after the drive test unit receives the drive test information acknowledgement message sent by the drive test information storage apparatus according to the drive test information request message, if the drive test unit determines that time of the drive test information that is included in the drive test information acknowledgement message received by the drive test unit is ineffective, or a quantity of UE related to the drive test information is insufficient, the drive test unit sends a drive test request message to a base station, where the drive test request message is used by the base station to trigger a positioning controller to perform a drive test on the user equipment.

With reference to the first possible implementation manner, in a second possible implementation manner, the drive test unit receives drive test information sent by the positioning controller, and the drive test information includes the positioning information, the measurement result, and the time stamp of the user equipment. The drive test information is sent by the positioning controller to the drive test unit according to indication information. In a process in which the base station triggers the positioning controller to perform the drive test on the user equipment, the indication information is included in a positioning request message sent by the UE to the positioning controller and is used to indicate that positioning of the positioning controller is used for a purpose of the drive test.

According to a tenth aspect, a drive test information exchange apparatus is provided, including: an element manager, configured to send a drive test information request message to a drive test information storage apparatus, where the drive test information request message includes a user equipment identifier, effective time, or a combination thereof, where the drive test information storage apparatus stores drive test information, and the drive test information includes positioning information, a measurement result, and a time stamp of user equipment; and a trace collection entity, configured to receive a drive test information acknowledgement message sent by the drive test information storage apparatus according to the user equipment identifier, the effective time, or the combination thereof, where the drive test information acknowledgement message includes the drive test information.

In a first possible implementation manner, after the trace collection entity receives the drive test information acknowledgement message sent by the drive test information storage apparatus according to the drive test information request message, if the element manager determines that time of the drive test information that is included in the drive test information acknowledgement message received by the drive test unit is ineffective, or a quantity of UE related to the drive test information is insufficient, the element manager sends a drive test request message to a base station, where the drive test request message is used by the base station to trigger a positioning controller to perform a drive test on the user equipment.

With reference to the first possible implementation manner, in a second possible implementation manner, the trace collection entity receives drive test information sent by the positioning controller, and the drive test information includes the positioning information, the measurement result, and the time stamp of the user equipment. The drive test information is sent by the positioning controller to the drive test unit according to indication information. In a process in which the base station triggers the positioning controller to perform the drive test on the user equipment, the indication information is included in a positioning request message sent by the UE to the positioning controller and is used to indicate that positioning of the positioning controller is used for a purpose of the drive test.

Because the drive test information storage apparatus provided in the embodiments of the present invention stores drive test information of user equipment, a drive test unit can invoke the drive test information from the drive test information storage apparatus. Therefore, a drive test is more flexible, a drive test process is simplified, and a delay is shorter.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
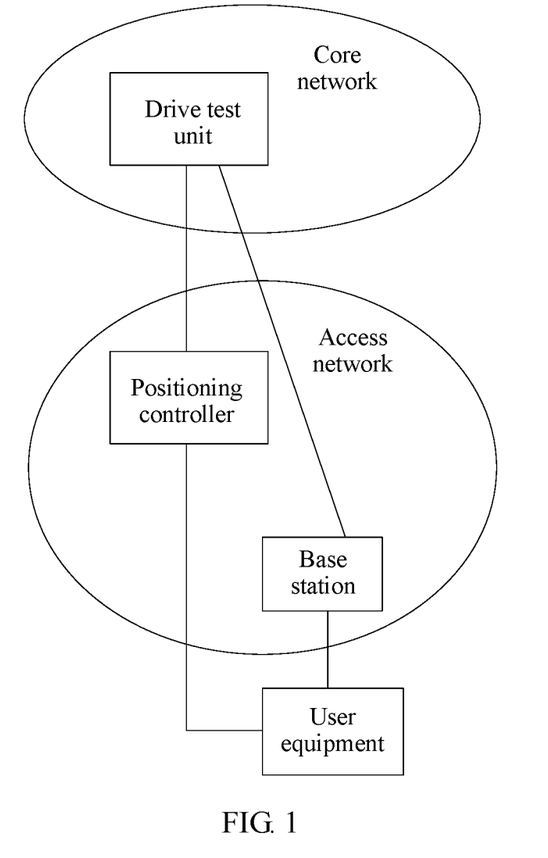
FIG. 1 is a system architecture diagram according to an embodiment of the present invention.

FIG. 1 is a system architecture according to an embodiment of the present invention. A system used in this embodiment of the present invention includes a drive test unit, a positioning controller, a base station, and the like.

In an optional embodiment, the drive test unit in this embodiment of the present invention may be an MDT unit. The drive test unit is a logical functional entity. The drive test unit includes an activation functional entity and a storage functional entity. An activation function of the drive test unit is implemented by an element manager (EM), and the EM is located on a network management device. The network management device is an operation, administration and maintenance (OAM) device. A storage function of the drive test unit is implemented by a trace collection entity (TCE), and the TEC may be a separate device or may be located on the network management device. The drive test unit may implement measurement on a radio signal by activating the base station, UE, and the positioning controller, and obtain drive test information that includes positioning information, a measurement result, and a time stamp of the UE. After obtaining the drive test information, the drive test unit stores the drive test information in the TCE. When needing to optimize quality of a network signal, an operator may invoke the drive test information from the drive test unit and use the drive test information as a basis for optimizing the network signal. The drive test unit in this embodiment of the present invention has an interface for interacting with the positioning controller and a drive test information storage apparatus, and the interface may be a serial interface, a parallel interface, or an interface in another possible form.

The positioning controller provided in this embodiment of the present invention may be named a single positioning controller (SPC), and certainly, the positioning controller may also be named another name. The "single" indicates that the positioning controller may be an independent network element, and is not disposed on a device with another network element. The positioning controller is located on an access network side, such as an evolved Universal Mobile Telecommunications System (UMTS) terrestrial radio access network (E-UTRAN), or a UMTS terrestrial radio access network (UTRAN). Certainly, the positioning controller may be a function module in a device, such as a positioning control module in the base station or a positioning control module in a mobility management entity (MME).

The positioning controller has functions such as positioning signal design and configuration, positioning measurement configuration and resource allocation, location calculation, track prediction, and multiple-radio access technology (RAT) hybrid positioning. The positioning signal design and configuration function notifies the UE of a signal on which a measurement is to be performed, such as a positioning reference signal PRS (PRS) or a channel state information-reference signal (CSI-RS). The positioning measurement configuration and resource allocation function can configure positioning measurement according to a positioning requirement, and configure a network resource for the positioning measurement, for example, configure a reference signal physical resource. The location calculation function performs positioning calculation according to different positioning solutions, for example, combines a positioning result obtained according to time of arrival and a positioning result obtained according to a fingerprint matching algorithm, so as to obtain a final positioning result. The track prediction function is that the positioning controller maintains track prediction and storage of a positioning terminal and interacts with a positioning database to obtain corresponding information about a user track behavior and habit. The multiple-RAT hybrid positioning function enables the positioning controller to be compatible with positioning solutions in multiple standards such as multiple RATs, for example, standards such as Long Term Evolution (LTE), UMTS, Code Division Multiple Access 2000 (CDMA2000), Global System for Mobile Communications (GSM), Bluetooth, Wireless Fidelity (WiFi), and ZigBee; and to support multiple positioning solutions such as GNSS positioning, OTDOA positioning, UTDOA positioning, e-CID positioning, RFPM positioning, an adaptive positioning manner of a neural network, and Beaconing positioning.

The positioning controller provided in this embodiment of the present invention has an interface for interacting with the drive test unit, and the interface may be a serial interface or a parallel interface. In the prior art, an E-SMLC that implements a positioning function is located on a core network, and the E-SMLC has no interface for interacting with a drive test unit. As a result, the E-SMLC needs to use a base station and UE to interact with the drive test unit. There are many process steps, and a delay is relatively long. By using a network architecture of this embodiment of the present invention, a positioning controller can directly send drive test information to a drive test unit by using an interface for interacting with the drive test unit, so that the drive test unit obtains the drive test information more quickly.

The base station provided in this embodiment of the present invention may be a base station (NB) in UMTS or an eNB in LTE.

The following further describes solutions of embodiments of the present invention with reference to the foregoing system architecture.

Figure 2:
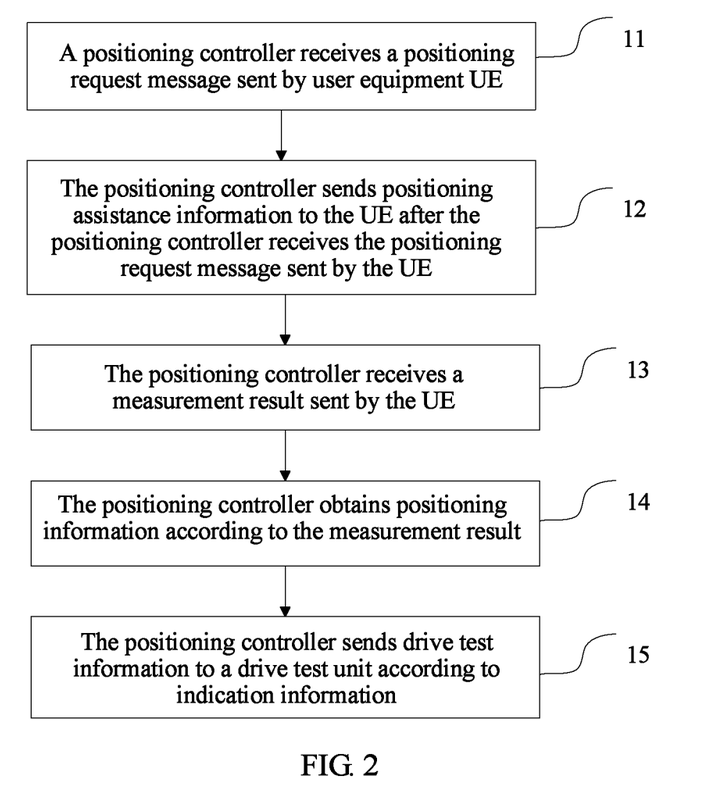
FIG. 2 is a flowchart of drive test information exchange based on a positioning controller according to an embodiment of the present invention.

FIG. 2 is a flowchart of drive test information exchange based on a positioning controller according to an embodiment of the present invention.

Step 11: A positioning controller receives a positioning request message sent by user equipment UE.

The positioning request message includes indication information indicating that positioning of the positioning controller is used for a purpose of a drive test.

In an optional embodiment, the positioning request message is sent to the positioning controller after the UE receives a logged measurement configuration message.

In an optional embodiment, the indication information is indication information of n bits, where n is a natural number. The present invention imposes no limitation on a specific form of the indication information.

Step 12: The positioning controller sends positioning assistance information to the UE after the positioning controller receives the positioning request message sent by the UE.

The user equipment performs measurement according to the positioning assistance message. Content delivered in the positioning assistance message depends on a used positioning manner. For example, OTDOA positioning is used, and the assistance message includes reference cell information and/or neighboring cell information. Each of the reference cell information and/or the neighboring cell information includes a physical cell identifier, a cell global identifier, an antenna port configuration, a positioning reference signal configuration, and the like.

In an optional embodiment, in step 12, when the positioning assistance message is sent to the user equipment, a positioning measurement configuration message is further sent to the user equipment. Optionally, the positioning measurement configuration message and the positioning assistance message may be sent in a same message. The user equipment performs the measurement according to the positioning assistance message and the positioning measurement configuration message. The positioning measurement configuration message may be sent by a base station to the UE, or sending the positioning measurement configuration message to the UE may be implemented by the positioning controller. The positioning measurement configuration message includes one of an intra-frequency measurement configuration, an inter-frequency measurement configuration, or an inter-system measurement configuration, or a combination thereof. The intra-frequency measurement configuration instructs the UE to perform the measurement in a same frequency band, the inter-frequency measurement configuration instructs the UE to perform the measurement in different frequency bands, and the inter-system measurement configuration instructs the UE to perform the measurement in different systems or signal standards.

Step 13: The positioning controller receives a measurement result sent by the UE.

The measurement result is obtained by the UE by performing the measurement according to the positioning assistance information.

Optionally, the measurement result in step 13 includes reference signal received power (RSRP), reference signal received quality (RSRQ), a reference signal time difference (RSTD), an Rx-Tx time difference (Rx-Tx Time Difference), or any combination thereof.

Step 14: The positioning controller obtains positioning information according to the measurement result.

By means of step 14, the positioning controller obtains the positioning information of the user equipment according to the measurement result and a positioning algorithm. The positioning algorithm includes but is not limited to a manner such as a GNSS manner, an OTDOA manner, an e-CID manner, or a UTDOA manner.

Step 15: The positioning controller sends drive test information to a drive test unit according to the indication information.

The drive test information includes the positioning information, the measurement result, and a time stamp. Specifically, after receiving the indication information, the drive test unit stores the indication information in a TCE of the drive test unit.

That the positioning controller sends the drive test information to the drive test unit according to the indication information in step 15 means that the positioning controller directly sends the drive test information to the drive test unit according to the indication information, and the drive test information does not need to be forwarded by another network device.

In step 11, the positioning controller receives the positioning request message sent by the UE, and the positioning request message includes the indication information indicating that the positioning request is used for the purpose of the drive test. Therefore, in step 15, after the positioning controller obtains the positioning information, the positioning controller indicates, according to the indication information, that the positioning of the positioning controller is used for the purpose of the drive test, and the positioning controller sends the drive test information to the drive test unit according to the indication information. The drive test information is directly sent to the drive test unit without passing through another network element, so that signaling exchange is simple, and a delay is shortened.

Figure 3:
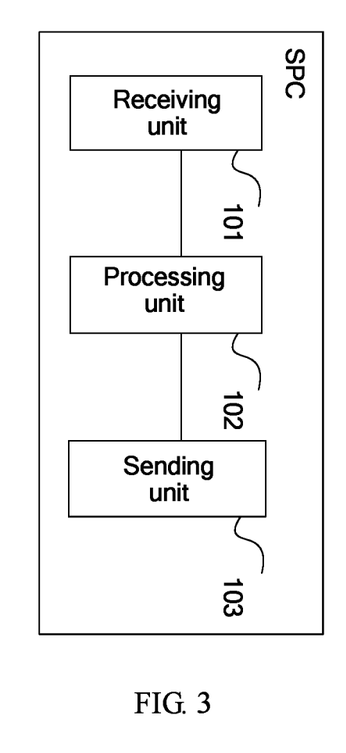
FIG. 3 is a schematic structural diagram of a positioning controller according to an embodiment of the present invention.

FIG. 3 is a schematic structural diagram of a positioning controller according to an embodiment of the present invention. The positioning controller includes a receiving unit 101, a processing unit 102, and a sending unit 103.

The receiving unit 101 is configured to receive a positioning request message sent by user equipment UE. The positioning request message includes indication information indicating that positioning of the positioning controller is used for a purpose of a drive test.

In an optional embodiment, the positioning request message is sent to the positioning controller after the UE receives a logged measurement configuration message.

In an optional embodiment, the indication information is indication information of n bits, where n is a natural number.

The sending unit 103 is configured to send positioning assistance information to the UE after the receiving unit receives the positioning request message sent by the UE.

The receiving unit 101 is further configured to receive a measurement result sent by the UE. The measurement result is obtained by the UE by performing measurement according to the positioning assistance information.

The processing unit 102 is configured to obtain positioning information according to the measurement result.

The sending unit 103 is configured to send drive test information to a drive test unit according to the indication information. The drive test information includes the positioning information, the measurement result, and a time stamp.

In an optional embodiment, the positioning controller is an access network element.

In an optional embodiment, the positioning controller has an interface for interacting with the drive test unit, and the interface is a serial interface or a parallel interface.

In an optional embodiment, the processing unit 102 may be a processor. Specifically, the processor may be a baseband processor, a digital signal processor (DSP), a field programmable gate array (FPGA), or a central processing unit (CPU). The receiving unit 101 may be a receiver. The sending unit 103 may be a transmitter. The receiving unit 101 and the sending unit 103 may be implemented by a transceiver. The receiver, the transmitter, and the transceiver may be a radio frequency circuit or a combination that includes the processor and a radio frequency circuit.

Figure 4:
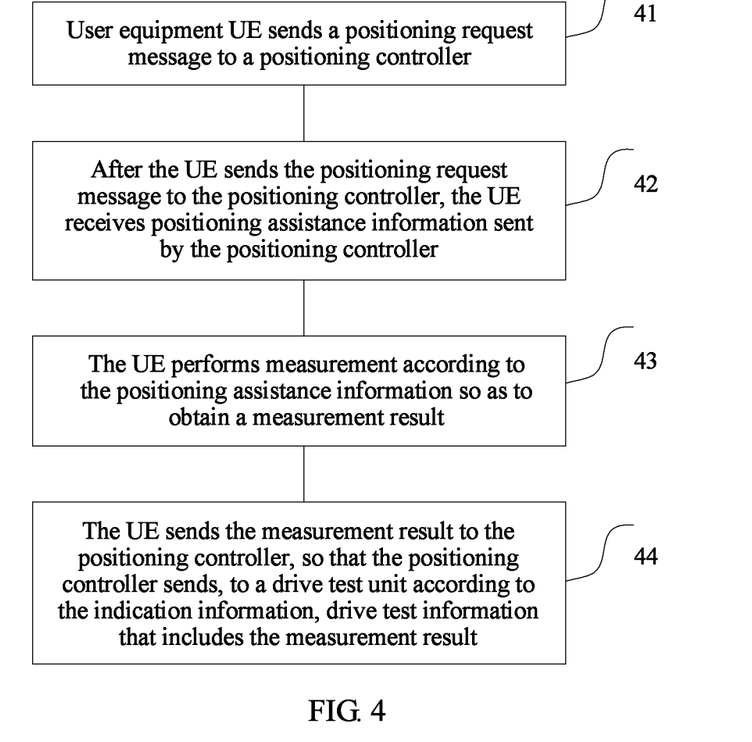
FIG. 4 is a flowchart of a method for exchange of a user equipment measurement result in drive test information according to an embodiment of the present invention.

FIG. 4 is a flowchart of a method for exchange of a user equipment measurement result in drive test information according to an embodiment of the present invention. Specific steps include:

Step 21: User equipment UE sends a positioning request message to a positioning controller.

The positioning request message includes indication information, where the indication information is used to indicate that positioning of the positioning controller is used for a purpose of a drive test.

In an optional embodiment, the positioning request message is sent to the positioning controller after the UE receives a logged measurement configuration message.

In an optional embodiment, the indication information is indication information of n bits, where n is a natural number. The present invention imposes no limitation on a specific form of the indication information. The indication information indicates that the positioning of the positioning controller is for the purpose of the drive test. After receiving the positioning request message that includes the indication information and calculating a positioning result, the positioning controller may send drive test information to a drive test unit without passing through another network element, and does not need to give a feedback to the UE, so that signaling exchange is simple, a delay is shortened, and an air interface resource is saved.

Step 22: After the UE sends the positioning request message to the positioning controller, the UE receives positioning assistance information sent by the positioning controller.

Step 23: The UE performs measurement according to the positioning assistance information so as to obtain a measurement result. The positioning assistance information and the measurement result are the same as those in FIG. 2. When the positioning assistance information is sent, a positioning measurement configuration message may further be delivered to the UE, and details are not repeatedly described herein.

Step 24: The UE sends the measurement result to the positioning controller, so that the positioning controller sends, to a drive test unit according to the indication information, drive test information that includes the measurement result.

In an optional embodiment, the UE has an interface for interacting with the positioning controller, and the interface is a serial interface or a parallel interface.

Figure 5:
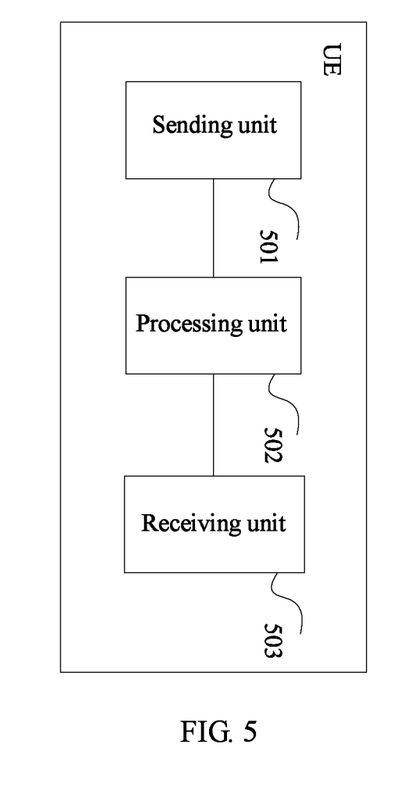
FIG. 5 is user equipment according to an embodiment of the present invention.

FIG. 5 is user equipment according to an embodiment of the present invention. The user equipment may be used for drive test information exchange, and the user equipment includes a sending unit 501, a processing unit 502, and a receiving unit 503.

The sending unit 501 is configured to send a positioning request message to a positioning controller.

The positioning request message includes indication information, where the indication information is used to indicate that positioning of the positioning controller is used for a purpose of a drive test.

In an optional embodiment, the positioning request message is sent by the sending unit to the positioning controller after the receiving unit receives a logged measurement configuration message.

In an optional embodiment, the indication information is indication information of n bits, where n is a natural number.

The receiving unit 503 is configured to: after the sending unit sends the positioning request message to the positioning controller, receive positioning assistance information sent by the positioning controller.

The processing unit 502 is configured to perform measurement according to the positioning assistance information so as to obtain a measurement result.

The sending unit 501 is further configured to send the measurement result to the positioning controller, so that the positioning controller sends, to a drive test unit according to the indication information, drive test information that includes the measurement result.

In an optional embodiment, the user equipment has an interface for interacting with the positioning controller, and the interface is a serial interface or a parallel interface.

In an optional implementation manner, the processing unit 502 may be a processor. Specifically, the processor may be a baseband processor, a digital signal processor (DSP), a field programmable gate array (FPGA), or a central processing unit (CPU). The receiving unit 503 may be a receiver. The sending unit 501 may be a transmitter. The receiving unit 503 and the sending unit 501 may be implemented by a transceiver. The receiver, the transmitter, and the transceiver may be a radio frequency circuit or a combination that includes the processor and a radio frequency circuit.

Figure 6:
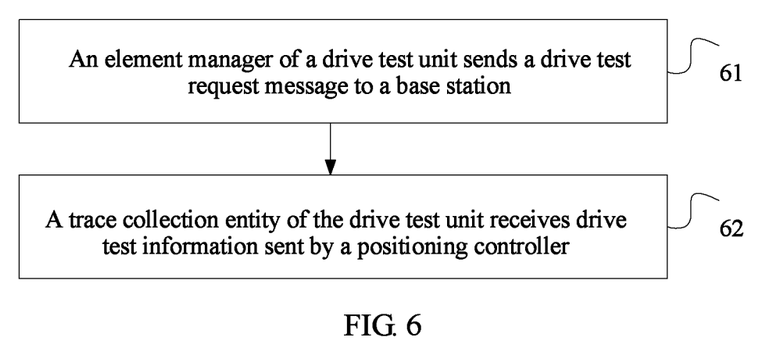
FIG. 6 is a flowchart of a drive test information exchange method according to an embodiment of the present invention.

FIG. 6 is a flowchart of a drive test information exchange method according to an embodiment of the present invention. Specific steps include:

Step 31: An element manager of a drive test unit sends a drive test request message to a base station.

The drive test request message is used by the base station to trigger a positioning controller to perform a drive test on user equipment.

Step 32: A trace collection entity of the drive test unit receives drive test information sent by a positioning controller.

The drive test information includes positioning information, a measurement result, and a time stamp of the user equipment, where the drive test information is sent by the positioning controller to the trace collection entity according to indication information; and in a process in which the base station triggers the positioning controller to perform the drive test on the user equipment, the indication information is included in a positioning request message sent by the UE to the positioning controller and is used to indicate that positioning of the positioning controller is used for a purpose of the drive test.

In an optional embodiment, the indication information is indication information of n bits, where n is a natural number. The present invention imposes no limitation on a specific form of the indication information. The indication information indicates that the positioning of the positioning controller is for the purpose of the drive test. After receiving the positioning request message that includes the indication information and calculating a positioning result, the positioning controller may send the drive test information to the drive test unit without passing through another network element, and does not need to give a feedback to the UE, so that signaling exchange is simple, a delay is shortened, and an air interface resource is saved.

In an optional embodiment, after the trace collection entity receives the drive test information sent by the positioning controller, if the element manager determines that time of the drive test information received by the trace collection entity is ineffective, or a quantity of UE related to the drive test information is insufficient, the element manager sends a drive test information request message to a drive test information storage apparatus so as to obtain new drive test information, and the drive test information storage apparatus is configured to store drive test information. Specifically, after the drive test unit receives the drive test information sent by the positioning controller, the drive test unit determines that the time of the drive test information received by the drive test unit is ineffective. For example, time corresponding to the received drive test information is expired, such as being later than time expected by a drive test entity. After the drive test unit receives the drive test information sent by the positioning controller, the drive test unit determines that the quantity of UE related to the drive test information received by the drive test unit is insufficient. For example, the quantity of UE related to the collected drive test information cannot meet a quantity expected by the drive test entity. In this case, the drive test unit sends the drive test information request message to the drive test information storage apparatus so as to obtain the new drive test information, and the drive test information storage apparatus is configured to store drive test information.

Figure 7:
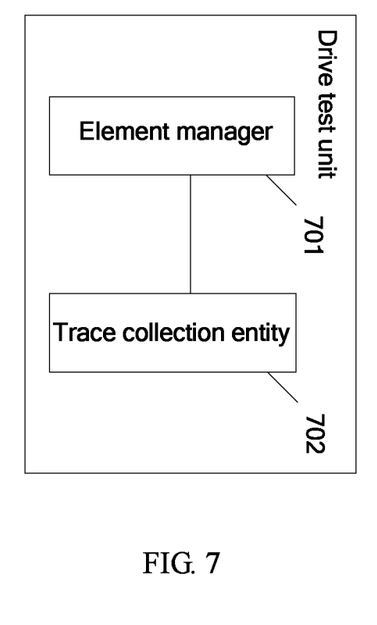
FIG. 7 is a drive test information exchange apparatus according to an embodiment of the present invention.

FIG. 7 is a drive test information exchange apparatus according to an embodiment of the present invention. The drive test information exchange apparatus includes an element manager 701 and a trace collection entity 702.

The element manager 701 is configured to send a drive test request message to a base station.

The drive test request message is used by the base station to trigger a positioning controller to perform a drive test on user equipment.

The trace collection entity 702 is configured to receive drive test information sent by a positioning collector.

The drive test information includes positioning information, a measurement result, and a time stamp of the user equipment, where the drive test information is sent by the positioning controller to the trace collection entity according to indication information; and in a process in which the base station triggers the positioning controller to perform the drive test on the user equipment, the indication information is included in a positioning request message sent by the UE to the positioning controller and is used to indicate that positioning of the positioning controller is used for a purpose of the drive test.

In an optional embodiment, after the trace collection entity receives the drive test information sent by the positioning controller, if the element manager determines that time of the drive test information received by the trace collection entity is ineffective, or a quantity of UE related to the drive test information is insufficient, the element manager sends a drive test information request message to a drive test information storage apparatus so as to obtain new drive test information, and the drive test information storage apparatus is configured to store drive test information. Specifically, after the drive test unit receives the drive test information sent by the positioning controller, the drive test unit determines that the time of the drive test information received by the drive test unit is ineffective. For example, time corresponding to the received drive test information is expired, such as being later than time expected by a drive test entity. After the drive test unit receives the drive test information sent by the positioning controller, the drive test unit determines that the quantity of UE related to the drive test information received by the drive test unit is insufficient. For example, the quantity of UE related to the collected drive test information cannot meet a quantity expected by the drive test entity. In this case, the drive test unit sends the drive test information request message to the drive test information storage apparatus so as to obtain the new drive test information, and the drive test information storage apparatus is configured to store drive test information.

Figure 8:
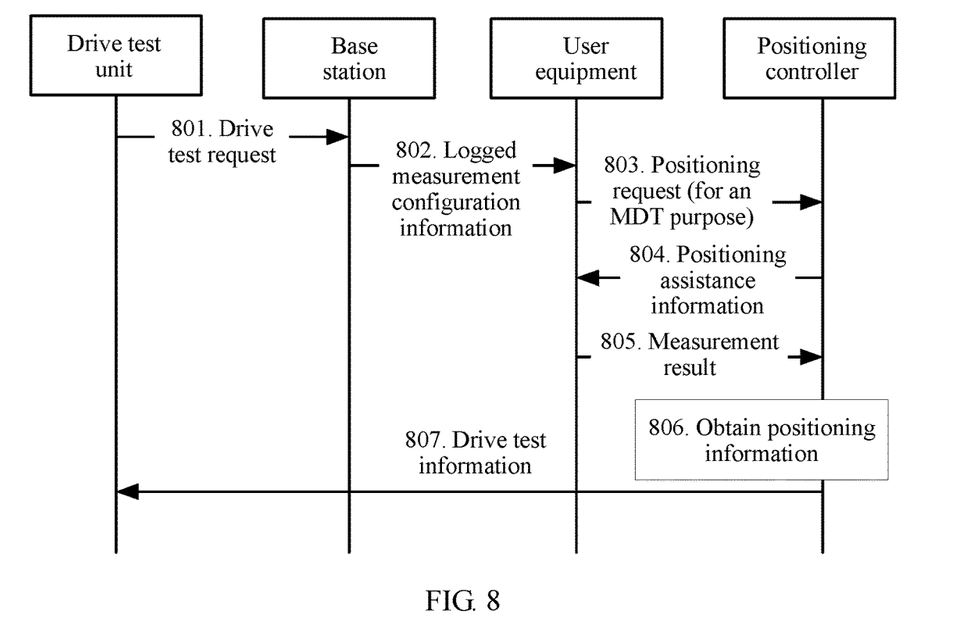
FIG. 8 is a signaling exchange diagram of a drive test based on a positioning controller according to an embodiment of the present invention.

FIG. 8 is a signaling exchange diagram of a drive test based on a positioning controller according to an embodiment of the present invention. Specific steps are as follows.

801. A drive test unit sends a drive test request to an eNB, and specifically, an element manager of the drive test unit sends a drive test request message to the base station.

The drive test request message is used by the base station to trigger a positioning controller to perform a drive test on user equipment.

802. The eNB delivers logged measurement configuration information to UE so as to notify the UE of a logged measurement result.

803. After the UE receives the logged measurement configuration message, the UE sends a positioning request message to a positioning controller.

The positioning request message includes indication information, where the indication information is used to indicate that positioning of the positioning controller is used for a purpose of the drive test.

In an optional embodiment, the indication information is indication information of n bits, where n is a natural number. The present invention imposes no limitation on a specific form of the indication information. The indication information indicates that the positioning of the positioning controller is for the purpose of the drive test. After receiving the positioning request message that includes the indication information and calculating a positioning result, the positioning controller may send drive test information to the drive test unit without passing through another network element, and does not need to give a feedback to the UE, so that signaling exchange is simple, a delay is shortened, and an air interface resource is saved.

804. The positioning controller sends positioning assistance information to the UE after the positioning controller receives the positioning request message sent by the UE.

Content delivered in the positioning assistance information depends on a used positioning manner. For example, OTDOA positioning is used, and the assistance information includes reference cell information and/or neighboring cell information. Each of the reference cell information and/or the neighboring cell information includes a physical cell identifier, a cell global identifier, an antenna port configuration, a positioning reference signal configuration, and the like. In an optional embodiment, when the positioning assistance information is sent, a positioning measurement configuration message may further be sent to the UE. The positioning measurement configuration message may be sent by the base station to the UE, or sending the positioning measurement configuration message to the UE may be implemented by the positioning controller. The user equipment performs measurement according to the positioning assistance information and the positioning measurement configuration message, where the positioning measurement configuration message includes one of an intra-frequency measurement configuration, an inter-frequency measurement configuration, or an inter-system measurement configuration, or a combination thereof. The intra-frequency measurement configuration instructs the UE to perform the measurement in a same frequency band, the inter-frequency measurement configuration instructs the UE to perform the measurement in different frequency bands, and the inter-system measurement configuration instructs the UE to perform the measurement in different systems or signal standards.

805. The UE performs measurement according to the positioning assistance information so as to obtain a measurement result.

In an optional embodiment, the measurement result in step 13 includes reference signal received power (RSRP), reference signal received quality (RSRQ), a reference signal time difference (RSTD), an Rx-Tx time difference, or any combination thereof.

806. The positioning controller obtains positioning information according to the measurement result.

By means of step 806, the positioning controller obtains the positioning information of the user equipment according to the measurement result and a positioning algorithm. The positioning algorithm includes but is not limited to a manner such as a GNSS manner, an OTDOA manner, an e-CID manner, or a UTDOA manner.

The positioning information may be in two dimensions (longitude and latitude) or three dimensions (longitude, latitude, and altitude).

807. The positioning controller sends drive test information to the drive test unit according to the indication information.

The drive test information includes the positioning information, the measurement result, and a time stamp. Specifically, after receiving the indication information, the drive test unit stores the indication information in a TCE of the drive test unit.

That the positioning controller sends the drive test information to the drive test unit according to the indication information in step 807 means that the positioning controller directly sends the drive test information to the drive test unit according to the indication information, and the drive test information does not need to be forwarded by another network device.

In step 803, the positioning controller receives the positioning request message sent by the UE, and the positioning request message includes the indication information indicating that the positioning request is used for the purpose of the drive test. Therefore, in step 807, after the positioning controller obtains the positioning information, the positioning controller indicates, according to the indication information, that the positioning of the positioning controller is used for the purpose of the drive test, and the positioning controller sends the drive test information to the drive test unit according to the indication information. The positioning controller provided in this embodiment of the present invention has an interface for interacting with the drive test unit. Therefore, the positioning controller sends the drive test information to the drive test unit without passing through another network element, so that signaling exchange is simple, and a delay is shortened.

Figure 9:
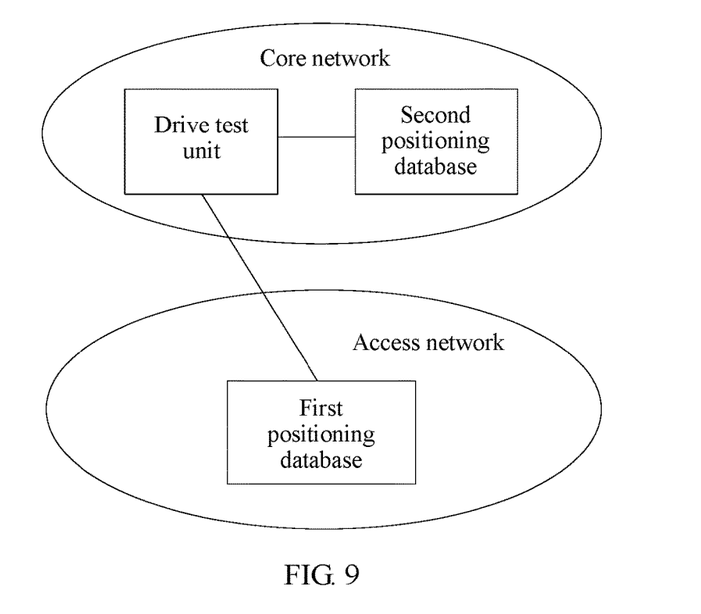
FIG. 9 is a system architecture of a drive test information exchange method based on a drive test information storage apparatus according to an embodiment of the present invention.

An embodiment of the present invention further provides a drive test information exchange method and apparatus based on a drive test information storage apparatus. A system to which this embodiment is applied includes a drive test unit and a drive test information storage apparatus. A specific architecture of this embodiment is shown in FIG. 9.

The drive test unit is the same as that in the foregoing embodiment, and details are not repeatedly described herein.

The drive test information storage apparatus provided in this embodiment has a drive test information storage function, and can store drive test information provided by a positioning controller. The drive test information includes positioning information, a measurement result, and a time stamp of UE. The drive test information storage apparatus includes a storage unit, a receiving unit, and a sending unit. The storage unit is configured to store drive test information. The receiving unit may receive a drive test information request message that is sent by the drive test unit and used to request to invoke the drive test information from the drive test information storage apparatus, and may receive the drive test information sent by the positioning controller. The drive test information is stored in the storage unit. The sending unit may invoke the drive test information from the storage unit according to the drive test information request message sent by the drive test unit, and then send the drive test information to the drive test unit. The drive test information storage apparatus may be located on an access network, and the storage unit of the drive test information storage apparatus located on the access network may be a first positioning database. Optionally, the first positioning database may be a local positioning database (LPD). The drive test information storage apparatus may be located on a core network, and the storage unit of the drive test information storage apparatus located on the core network may be a second positioning database. Optionally, the second positioning database may be a cloud positioning database (CPD). Data stored in the first positioning database is within a coverage area of one positioning controller, that is, the so-called local positioning database, and the one positioning controller may cover an area of several base stations. Data stored in the second positioning database is within a coverage area of multiple positioning controllers, that is, a wide-area or cloud positioning database, and each of the multiple positioning controllers may cover an area of several base stations. The CPD is configured to store positioning information of a large area and long time.

Figure 10:
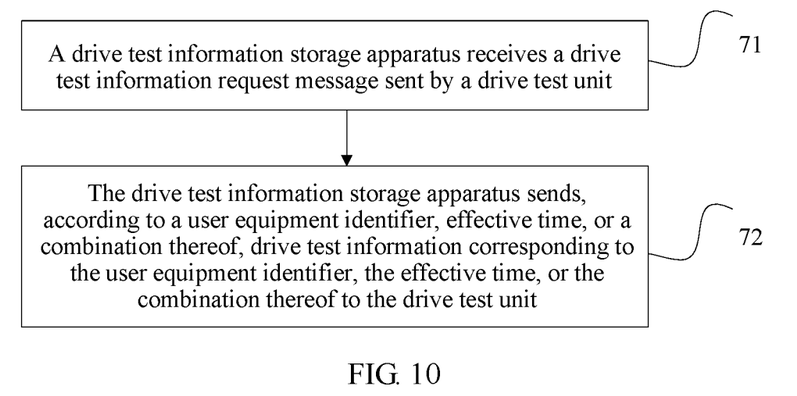
FIG. 10 is a drive test information exchange method according to an embodiment of the present invention.

FIG. 10 is a drive test information exchange method according to the present invention. Specific steps are as follows.

Step 71: A drive test information storage apparatus receives a drive test information request message sent by a drive test unit.

The drive test information request message includes a user equipment identifier, effective time, or a combination thereof. The drive test information storage apparatus stores drive test information, and the drive test information includes positioning information, a measurement result, and a time stamp of user equipment.

Step 72: The drive test information storage apparatus sends, according to the user equipment identifier, the effective time, or the combination thereof, the drive test information corresponding to the user equipment identifier, the effective time, or the combination thereof to the drive test unit.

In an optional embodiment, the drive test information storage apparatus includes a storage unit. The storage unit includes a first positioning database. The first positioning database is configured to store positioning information, a measurement result, and a time stamp within a coverage area of one positioning controller.

In an optional embodiment, the drive test information storage apparatus includes a storage unit. The storage unit includes a second positioning database. The second positioning database is configured to store positioning information, a measurement result, and a time stamp within a coverage area of multiple positioning controllers.

In an optional embodiment, the drive test information storage apparatus has an interface for interacting with the drive test unit, and the interface is a serial interface or a parallel interface.

Figure 11:
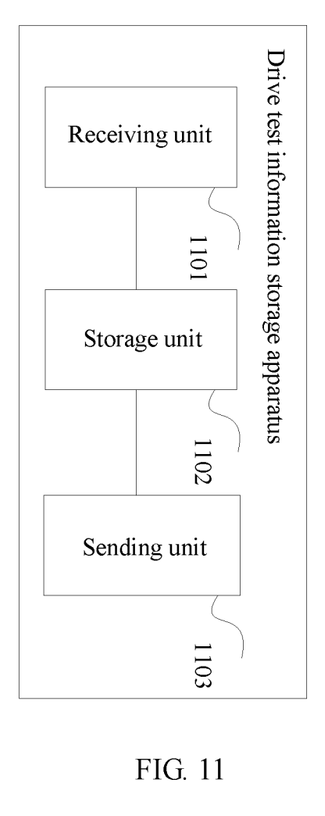
FIG. 11 is a structural diagram of a drive test information storage apparatus according to an embodiment of the present invention.

FIG. 11 is a structural diagram of a drive test information storage apparatus according to an embodiment of the present invention. The drive test information storage apparatus includes a receiving unit 1101, a storage unit 1102, and a sending unit 1103.

The receiving unit 1101 is configured to receive a drive test information request message sent by a drive test unit.

The drive test information request message includes a user equipment identifier, effective time, or a combination thereof.

The storage unit 1102 stores drive test information, and the drive test information includes positioning information, a measurement result, and a time stamp of user equipment.

The sending unit 1103 is configured to send, according to the user equipment identifier, the effective time, or the combination thereof, the drive test information corresponding to the user equipment identifier, the effective time, or the combination thereof to the drive test unit.

In an optional embodiment, the storage unit includes a first positioning database. The first positioning database is configured to store positioning information, a measurement result, and a time stamp within a coverage area of one positioning controller.

In an optional embodiment, the storage unit includes a second positioning database. The second positioning database is configured to store positioning information, a measurement result, and a time stamp within a coverage area of multiple positioning controllers.

In an optional embodiment, the first positioning database or the second positioning database has an interface for interacting with the drive test unit, and the interface is a serial interface or a parallel interface.

In an optional implementation manner, the storage unit 1102 may be a memory, the receiving unit 1101 may be a receiver, and the sending unit 1103 may be a transmitter. The receiving unit 1101 and the sending unit 1103 may be implemented by a transceiver. The receiver, the transmitter, and the transceiver may be a radio frequency circuit or a combination that includes the processor and a radio frequency circuit.

Figure 12:
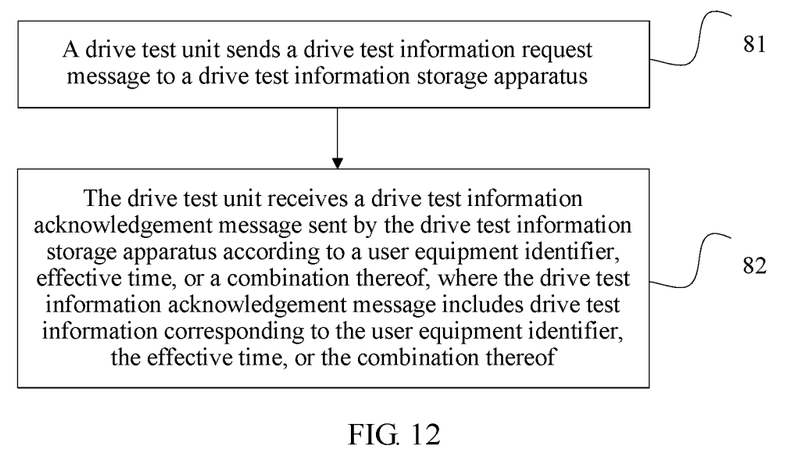
FIG. 12 is a drive test information exchange method according to an embodiment of the present invention.

FIG. 12 is a drive test information exchange method according to an embodiment of the present invention. Specific steps are as follows.

Step 81: A drive test unit sends a drive test information request message to a drive test information storage apparatus. Optionally, an element manager of the drive test unit sends the drive test information request message to the drive test information storage apparatus.

The drive test information request message includes a user equipment identifier, effective time, or a combination thereof. The drive test information storage apparatus stores drive test information, and the drive test information includes positioning information, a measurement result, and a time stamp of user equipment.

Step 82: The drive test unit receives a drive test information acknowledgement message sent by the drive test information storage apparatus according to the user equipment identifier, the effective time, or the combination thereof, where the drive test information acknowledgement message includes the drive test information corresponding to the user equipment identifier, the effective time, or the combination thereof. Optionally, a trace collection entity of the drive test unit receives the drive test information acknowledgement message sent by the drive test information storage apparatus according to the user equipment identifier, the effective time, or the combination thereof.

In an optional embodiment, after the drive test unit receives the drive test information acknowledgement message sent by the drive test information storage apparatus according to the drive test information request message, if the drive test unit determines that time of the drive test information that is included in the drive test information acknowledgement message received by the drive test unit is ineffective, or a quantity of UE related to the drive test information is insufficient, the drive test unit sends a drive test request message to a base station. The drive test request message is used by the base station to trigger a positioning controller to perform a drive test on the user equipment. Optionally, after the trace collection entity of the drive test unit receives the drive test information acknowledgement message sent by the drive test information storage apparatus according to the drive test information request message, if the element manager of the drive test unit determines that time of the drive test information that is included in the drive test information acknowledgement message received by the drive test unit is ineffective, or a quantity of UE related to the drive test information is insufficient, the element manager of the drive test unit sends a drive test request message to a base station. The drive test request message is used by the base station to trigger a positioning controller to perform a drive test on the user equipment. Specifically, after the drive test unit receives the drive test information sent by the positioning controller, the drive test unit determines that the time of the drive test information received by the drive test unit is ineffective. For example, time corresponding to the received drive test information is expired, such as being later than time expected by a drive test entity. After the drive test unit receives the drive test information sent by the positioning controller, the drive test unit determines that the quantity of UE related to the drive test information received by the drive test unit is insufficient. For example, the quantity of UE related to the collected drive test information cannot meet a quantity expected by the drive test entity. In this case, the drive test unit sends the drive test information request message to the drive test information storage apparatus so as to obtain new drive test information, and the drive test information storage apparatus is configured to store drive test information.

In an optional embodiment, the drive test unit receives drive test information sent by a positioning controller. The drive test information includes the positioning information, the measurement result, and the time stamp of the user equipment; the drive test information is sent by the positioning controller to the drive test unit according to indication information; and in a process in which the base station triggers the positioning controller to perform the drive test on the user equipment, the indication information is included in a positioning request message sent by the UE to the positioning controller and is used to indicate that positioning of the positioning controller is used for a purpose of the drive test. Optionally, the trace collection entity of the drive test unit receives the drive test information sent by the positioning controller.

Figure 13:
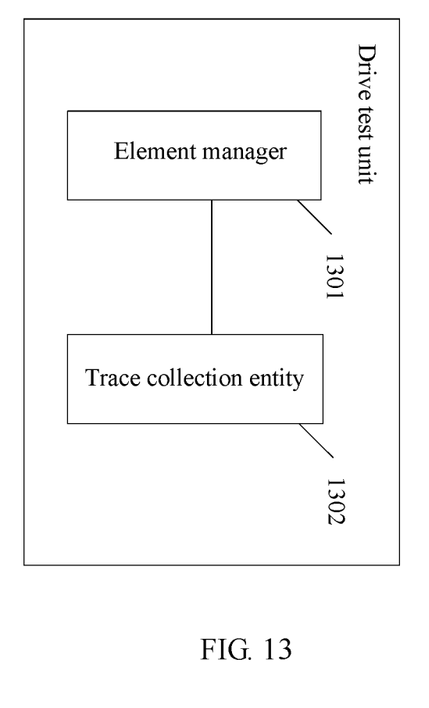
FIG. 13 is a drive test information exchange apparatus according to an embodiment of the present invention.

FIG. 13 is a drive test information exchange apparatus according to an embodiment of the present invention. The drive test information exchange apparatus includes an element manager 1301 and a trace collection entity 1302.

The element manager 1301 is configured to send a drive test information request message to a drive test information storage apparatus.

The drive test information request message includes a user equipment identifier, effective time, or a combination thereof.

The drive test information storage apparatus stores drive test information, and the drive test information includes positioning information, a measurement result, and a time stamp of user equipment.

The trace collection entity 1302 is configured to receive a drive test information acknowledgement message sent by the drive test information storage apparatus according to the user equipment identifier, the effective time, or the combination thereof, where the drive test information acknowledgement message includes the drive test information corresponding to the user equipment identifier, the effective time, or the combination thereof.

In an optional embodiment, after the trace collection entity receives the drive test information acknowledgement message sent by the drive test information storage apparatus according to the drive test information request message, if the element manager determines that time of the drive test information that is included in the drive test information acknowledgement message received by the drive test unit is ineffective, or a quantity of UE related to the drive test information is insufficient, the element manager sends a drive test request message to a base station. The drive test request message is used by the base station to trigger a positioning controller to perform a drive test on the user equipment.

In an optional embodiment, the trace collection entity receives drive test information sent by a positioning controller. The drive test information includes the positioning information, the measurement result, and the time stamp of the user equipment; the drive test information is sent by the positioning controller to the drive test unit according to indication information; and in a process in which the base station triggers the positioning controller to perform the drive test on the user equipment, the indication information is included in a positioning request message sent by the UE to the positioning controller and is used to indicate that positioning of the positioning controller is used for a purpose of the drive test.

Figure 14:
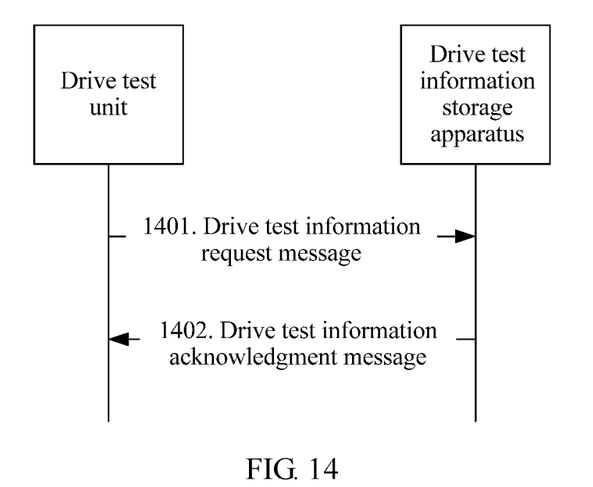
FIG. 14 is a signaling exchange diagram of invoking drive test information from a drive test information storage apparatus by a drive test unit according to an embodiment of the present invention.

FIG. 14 is a signaling exchange diagram of invoking drive test information from a drive test information storage apparatus by a drive test unit according to an embodiment of the present invention. Specific steps are as follows.

1401. An element manager of a drive test unit sends a drive test information request message to a drive test information storage apparatus.

The drive test information request message includes a user equipment identifier, effective time, or a combination thereof. The drive test information storage apparatus stores drive test information, and the drive test information includes positioning information, a measurement result, and a time stamp of user equipment. The drive test information request message includes the UE identifier, the effective time, or the combination thereof. The UE identifier is used to invoke drive test information of specified UE. The effective time is used to request the drive test information storage apparatus to send drive test information that is in an effective time period. For example, if the drive test information request message includes the UE identifier and the effective time, drive test information that is in the effective time period and of the UE that is specified by the UE identifier is invoked from the drive test information storage apparatus. If the drive test information request message merely includes the UE identifier, drive test information that is in a time period (such as several or tens of minutes) and of the UE that is specified by the UE identifier is invoked from the drive test information storage apparatus. If the drive test information request message merely includes the effective time, drive test information that is in the effective time and of all UE is invoked from the drive test information storage apparatus.

In an optional embodiment, the drive test information storage apparatus includes a storage unit. The storage unit includes a first positioning database. The first positioning database is configured to store positioning information, a measurement result, and a time stamp within a coverage area of one positioning controller. In an optional embodiment, the storage unit includes a second positioning database. The second positioning database is configured to store positioning information, a measurement result, and a time stamp within a coverage area of multiple positioning controllers.

1402. The drive test information storage apparatus sends a drive test information acknowledgement message to a trace collection entity of the drive test unit according to the user equipment identifier, the effective time, or the combination thereof.

The drive test information acknowledgement message includes the drive test information.

In an optional embodiment, the drive test information includes the positioning information, the measurement result, and the time stamp of the user equipment. The positioning information may be in two dimensions (longitude and latitude) or three dimensions (longitude, latitude, and altitude).

By means of the foregoing steps, a drive test unit may invoke drive test information of user equipment that is stored in a drive test information storage apparatus. Because the drive test information storage apparatus stores the drive test information of the user equipment, the drive test unit can invoke the drive test information from the drive test information storage apparatus. Therefore, a drive test is more flexible, a drive test process is simplified, and a delay is shorter.

The embodiments of the present invention and features in the embodiments may be mutually combined if they do not conflict with each other.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A drive test information exchange method, comprising:
    receiving, by a positioning controller, a positioning request message sent by user equipment (UE), wherein the positioning request message comprises indication information indicating that positioning of the positioning controller is used for a purpose of a drive test;

sending, by the positioning controller, positioning assistance information to the UE after the positioning controller receives the positioning request message sent by the UE;

receiving, by the positioning controller, a measurement result sent by the UE, wherein the measurement result is obtained by the UE by performing measurement according to the positioning assistance information;

obtaining, by the positioning controller, positioning information according to the measurement result; and sending, by the positioning controller, drive test information to a drive test unit according to the indication information, wherein the drive test information comprises the positioning information, the measurement result, and a time stamp.

2. The method according to claim 1, wherein the positioning controller is an access network element.

3. The method according to claim 1, wherein the indication information is indication information of n bits, and n is a natural number.

4. The method according to claim 1, wherein the positioning controller has an interface for interacting with the drive test unit, and the interface is a serial interface or a parallel interface.

5. A positioning controller, comprising:

a receiving unit, configured to receive a positioning request message sent by user equipment (UE), wherein the positioning request message comprises indication information indicating that positioning of the positioning controller is used for a purpose of a drive test;

a sending unit, configured to send positioning assistance information to the UE after the receiving unit receives the positioning request message sent by the UE, wherein the receiving unit is further configured to receive a measurement result sent by the UE, wherein the measurement result is obtained by the UE by performing measurement according to the positioning assistance information; and a processing unit, configured to obtain positioning information according to the measurement result, wherein the sending unit is configured to send drive test information to a drive test unit according to the indication information, wherein the drive test information comprises the positioning information, the measurement result, and a time stamp.

6. The positioning controller according to claim 5, wherein the positioning controller is an access network element.

7. The positioning controller according to claim 5, wherein the indication information is indication information of n bits, and n is a natural number.

8. The positioning controller according to claim 5, wherein the positioning controller has an interface for interacting with the drive test unit, and the interface is a serial interface or a parallel interface.

9. A drive test information exchange method, comprising:

sending, by an element manager of a drive test unit, a drive test request message to a base station, wherein the drive test request message is used by the base station to trigger a positioning controller to perform a drive test on user equipment; and receiving, by a trace collection entity of the drive test unit, drive test information sent by the positioning controller, wherein the drive test information comprises positioning information, a measurement result, and a time stamp of the user equipment (UE); the drive test information is sent by the positioning controller to the trace collection entity according to indication information; and in a process in which the base station triggers the positioning controller to perform the drive test on the user equipment, the indication information is comprised in a positioning request message sent by the UE to the positioning controller and is used to indicate that positioning of the positioning controller is used for a purpose of the drive test.

10. The method according to claim 9, wherein after the trace collection entity receives the drive test information sent by the positioning controller, if the element manager determines that time of the drive test information received by the trace collection entity is ineffective, or a quantity of UE related to the drive test information is insufficient, the element manager sends a drive test information request message to a drive test information storage apparatus so as to obtain new drive test information, and the drive test information storage apparatus is configured to store drive test information.

11. A drive test information exchange apparatus, comprising:

an element manager, configured to send a drive test request message to a base station, wherein the drive test request message is used by the base station to trigger a positioning controller to perform a drive test on user equipment; and a trace collection entity, configured to receive drive test information sent by the positioning controller, wherein the drive test information comprises positioning information, a measurement result, and a time stamp of the user equipment; the drive test information is sent by the positioning controller to the trace collection entity according to indication information; and in a process in which the base station triggers the positioning controller to perform the drive test on the user equipment (UE), the indication information is comprised in a positioning request message sent by the UE to the positioning controller and is used to indicate that positioning of the positioning controller is used for a purpose of the drive test.

12. The apparatus according to claim 11, wherein after the trace collection entity receives the drive test information sent by the positioning controller, if the element manager determines that time of the drive test information received by the trace collection entity is ineffective, or a quantity of UE related to the drive test information is insufficient, the element manager sends a drive test information request message to a drive test information storage apparatus so as to obtain new drive test information, and the drive test information storage apparatus is configured to store drive test information.

* * * * *